(12) United States Patent
Galand et al.

(10) Patent No.: US 6,226,266 B1
(45) Date of Patent: May 1, 2001

(54) END-TO-END DELAY ESTIMATION IN HIGH SPEED COMMUNICATION NETWORKS

(75) Inventors: Claude Galand, La Colle/Loup; Maurice Duault, Saint Laurent du Var; Aline Fichou, La Colle sur Loup; Olivier Bertin, Eybens, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/946,237

(22) Filed: Oct. 7, 1997

(30) Foreign Application Priority Data

Dec. 13, 1996 (EP) .................................................. 96480115

(51) Int. Cl.$^7$ .................................................. H04L 12/56
(52) U.S. Cl. .......................................... 370/235; 370/252
(58) Field of Search ..................................... 370/230, 231, 370/235, 238, 395, 397, 412, 413, 465, 468, 252, 351, 400

(56) References Cited

U.S. PATENT DOCUMENTS

| | | | |
|---|---|---|---|
| 5,572,523 | * 11/1996 | Katsube et al. | 370/231 |
| 5,675,384 | * 10/1997 | Ramammurthy et al. | 370/468 |
| 5,737,314 | * 4/1998 | Hatano et al. | 370/235 |
| 5,850,385 | * 12/1998 | Esaki | 370/216 |

* cited by examiner

*Primary Examiner*—Chau Nguyen
*Assistant Examiner*—Soon-Dong Hyun
(74) *Attorney, Agent, or Firm*—Cesari and McKenna, LLP

(57) ABSTRACT

An apparatus and method that determines the end-to-end transit delay at each node of a path, in accordance with the selected probability value indicative of the probability to experience a delay at each node that is smaller than the computed transit delay. Then the computed transit delays per nodes are combined to obtain the end-to-end delay of the path, the combination being either an arithmetic operation or a convolution operation. A method to approximate the convolution operation is also disclosed.

11 Claims, 4 Drawing Sheets

END-TO-END DELAY ESTIMATION IN HIGH SPEED COMMUNICATION NETWORKS

TECHNICAL FIELD

The present invention relates to high speed communication networks and more particularly to a method to efficiently estimate the end-to-end delay of a path between an origin and a destination node in a high speed packet switching network.

BACKGROUND ART

The emergence of high speed/bandwidth networking technologies now makes possible the integration of multiple types of traffic like speech, video and data over the same communication network. The end user applications that generate such different types of traffic, while using the same transmission media of the network, i.e. nodes and transmission links, have different requirements regarding the transmission characteristics over the network. These applications requirements, commonly called quality of service (QoS) requirements, are taken into account during the path selection process.

The role of the path selection process is to determine optimum paths for user applications across the network each time a connection is requested, commonly referred to as call setup. This implies the allocation of network resources to users in order to guarantee their QoS requirements while optimizing the overall throughput within the network. This function may take place entirely within the origin node. Various QoS parameters may be specified by the users, some of them in order to satisfy real-time delivery constraints, others related to non real-time data traffic transfer. The origin node computes a path to the destination node that is capable of carrying the new connection and providing the level of service required by the new connection. The path selection algorithm uses data describing the current traffic load in the entire network. Such data are stored in a topology database located in each input node of the network. If no suitable paths can be found that meet all the requirements, the connection is rejected. Once the origin node has found a suitable path, a setup message is generated which traverses the selected route, updating the resource allocations for each link visited by the setup message.

The quality of service can be defined as a set of measurable quantities that describe the user's perception of the service offered by the network like the connection setup delay, the connection blocking probability, the loss probability, the error probability, the end-to-end transit delay and the end-to-end delay variation also referred to as jitter.

The present application focuses on end-to-end transit delay (hereinafter referred also to as EED) estimation. At each connection setup, during path selection, an estimation of the EED is computed for each path selected. The precision of the end-to-end delay estimation is important since the acceptance or the rejection of a connection may depend on whether or not the computed EED violates the QoS specification. If the EED computed is too "optimistic", the path for which it applies can be accepted and the connection granted while the QoS specifications of the connection may not actually be guaranteed. In the other hand, if the EED estimation is computed in a too "pessimistic" way, a connection can be rejected because no paths can be found that satisfy the QoS EED requested by the connection.

Consequently, an accurate method for computing an EED estimation of a path from an origin node to a destination node in a communication network, is required in order to make a precise screening of paths regarding the QoS end-to-end transit delay specification of a connection being set up.

In many products of the prior art and particularly in the standard defined by the ATM Forum which applies to high speed packet switching networks, the current method for computing an EED estimation of a path is based on the mere addition of the maximum delays per hop along the path. A hop defines a node associated with the link that connects that node to the next node of the path.

Moreover the maximum delay per hop along the considered path is specified as being the maximum time that a packet/cell can wait in a switching node (queuing time) in addition to the fixed propagation delay of the link that connects that node to the next one.

This common approach can be summarized by the following equations:

the connection is granted if:

$$Tqos > Tmax \quad (1)$$

with $$Tmax = \sum_{i=1}^{N} (Qmax(i) + P(i)) \quad (2)$$

where:

Tqos is the maximum end-to-end delay specified by the connection Qos.

Tmax is the EED estimate of the selected path.

N is the number of nodes in the selected path.

Qmax(i) is the maximum queuing time of node i.

P(i) is the propagation time of the link that connects node i to node i+1.

The disadvantage with the common approach (illustrated by formulas (1) and (2)) resides in that experience, which is mathematically corroborated, shows that the probability for one to observe in reality the delay estimated Tmax for the considered path is negligeable. Tmax is a "worst case" delay which implies that most of the time the connection will be rejected unless the customer specifies very high Tqos.

Referring to equation (2) above, the maximum queuing time of node i, Qmax(i) can be expressed as follows:

$$Qmax(i) = \frac{X(i)}{S(i)} \quad (3)$$

where:

X(i) is the buffer size of node i of the selected path;

S(i) is the speed of the link that connects node i to node i+1.

Qmax(i), P(i) and X(i) are specified in the topology database.

if $\epsilon$ denotes the engineered loss probability on the links of the network then delay Tmax of equation (2) is observed with a probability of $\epsilon^N$ (considering that a packet/cell transmitted over the selected path observes the maximum queuing time at each node of the path). For example, considering the network of the preferred embodiment of the invention, $\epsilon$ is a network constant whose value is $5.10^{-8}$. If N=5 (the path comprises five nodes), then the probability to observe an estimated end-to-end delay Tmax according to formula (2) is $3.10^{-37}$. This negligeable probability value clearly shows that it is absolutely unrealistic to use formula (2) for estimating the EED in order to check the conformance of the selected path with the delay specified in the connection QoS as with formula (1).

This problem raises the need to have an estimation of the EED which is more accurate than the common Tmax estimation, for the relation (1) to be realistically usable.

SUMMARY OF THE INVENTION

The object of the present invention is to improve the estimation of the end-to-end delay of a path from an origin node to a destination node in a communication network.

In brief, according to the invention this object is achieved by providing a network node for a packet switched communication network, the node having at least one input and at least one output with a queuing delay associated with passage of a packet from one input to one output. The node is characterised in that it comprises logic arranged to provide an estimation of the queuing delay for use in connection routing or other purposes, the estimated queuing delay being such that there is a selected probability for packets to experience a queuing delay larger than the estimated queuing delay based on an approximated probability distribution for packet transmission times through the node.

Another aspect of the invention provides a method for estimating the end-to-end delay of a path comprising N nodes from an origin node to a destination node in a communication network. The method is characterised in that it comprises the following steps of:

a) computing for each node along said path an estimated queuing delay;

b) combining for each node of the path said estimated queuing delay with the propagation time of the link that connects said each node to the next node of said path to provide a second delay value associated with said each node;

c) combining all said second delay values to provide an estimation of the end-to-end delay of said path.

The method of the invention is much more accurate than the common approach of "sum of max delay per node", because it relies on a probabilistic approach. Furthermore this method allows a computation of the end-to-end delay which is adaptive to the class of service requested e.g. real-time, non real-time, by selecting accordingly a probability value which drives the queuing delay per node calculation.

Preferably the method comprises the step of computing an approximate of the convolution function of the queuing delays associated with each node of the path.

BRIEF DESCRIPTION OF THE DRAWINGS

An embodiment of the invention will now be described, by way of example only, with reference to the accompanying drawings, wherein.

DETAILED DESCRIPTION OF PREFERRED EMBODIMENT(S) OF THE INVENTION

Figure 1:
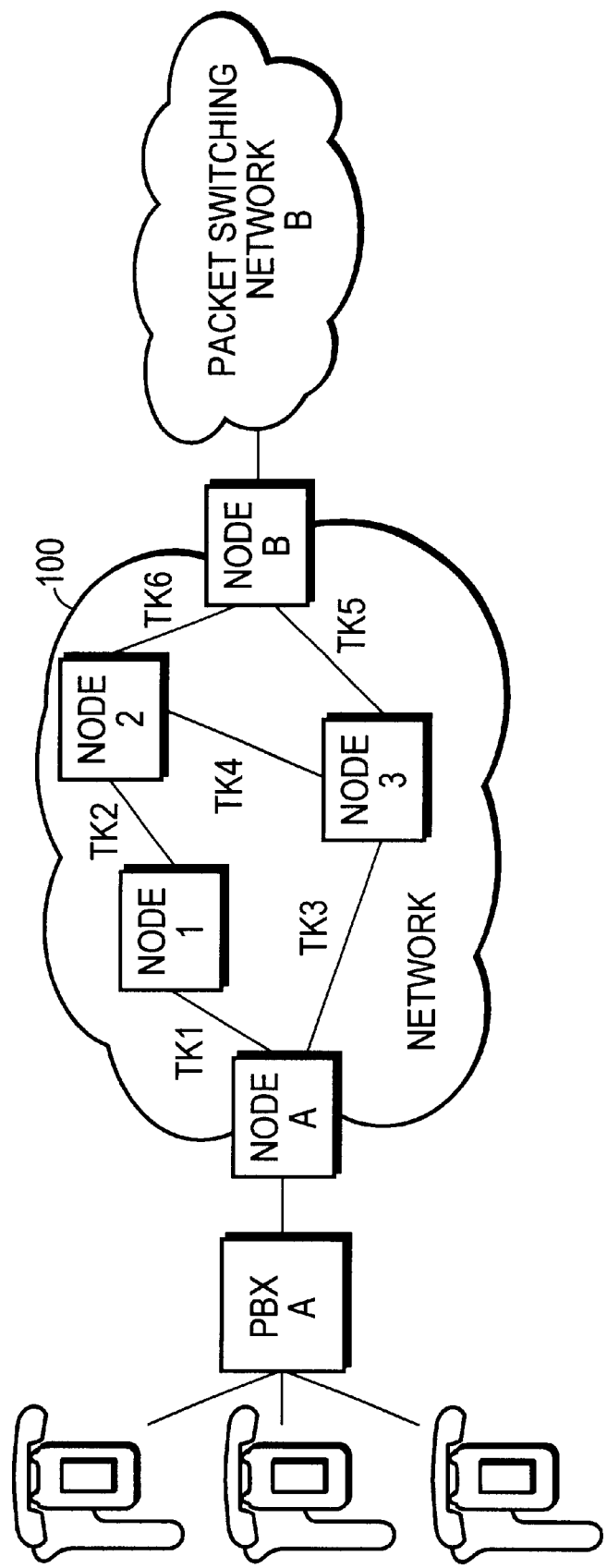
FIG. 1 is a schematic diagram illustrating the structure of a typical communication network.

FIG. 1 represents a packet/cell switching network 100 wherein the invention could be implemented. This network is represented as including three intermediate nodes labelled Node 1, Node 2 and Node 3, and at the edge of the network, two access nodes labelled Node A and Node B. These nodes are interconnected by links or trunks labelled TK1, TK2, etc . . . As an illustration, a PBX(A) is connected to Access Node A while a secondary packet switching network is attached to Access Node B. If a connection is requested from Access Node A to Access Node B the path selection process is operated in Node A by a specific adapter called Control Point. The path selection process will compute the end-to-end delay for all the paths available from Node A to Node B, until a path corresponding to the QoS requirements is found. In the preferred embodiment of the invention, the path selection process is a broadcast process, which is "artificially" spread from one node to all its neighbours (the process remains local to the topology database) until the destination is reached. In this case, naturally, the path which minimizes the number of hops is discovered first, and then chosen if it complies with the connection requirements.

The computation of the end-to-end delay can be improved in two ways:

The delay inside a node of a considered path should not be anymore the maximum delay (i.e. the maximum queuing time) but a delay quantile, that is, a delay value for which the probability to observe a delay higher than this value is considered as being small enough.

The arithmetic sum of the delays per node along the path should be replaced by a probability convolution which theorically provides the best realistic estimation of the end-to-end delay value. To that end, a method to estimate this probability convolution is provided.

Figure 2:
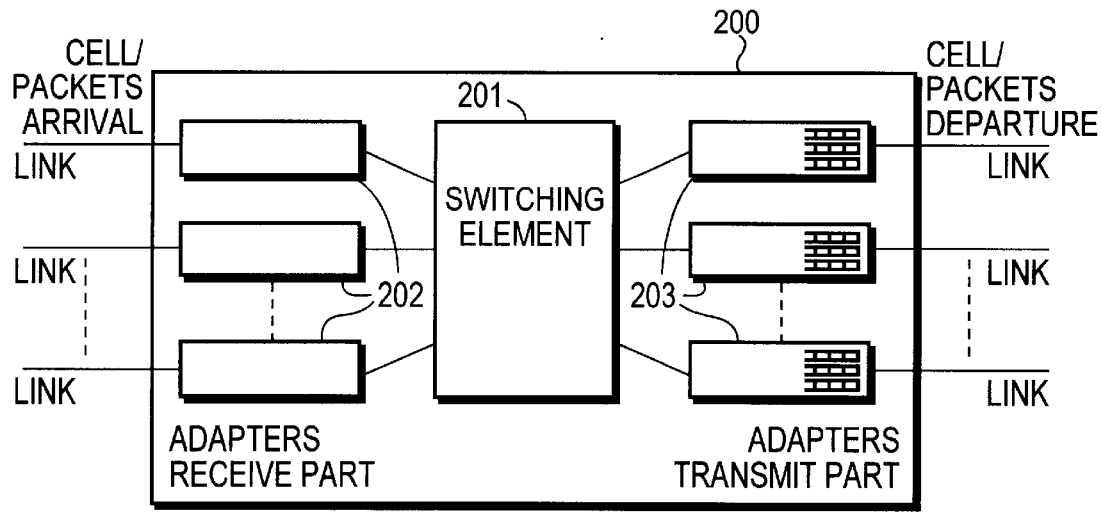
FIG. 2 shows the structure of a switching node.

In FIG. 2, a switching node 200 with its main queuing points is shown. The switching node considered is based on a switching element 201 with output queuing, i.e. there is no spacing of the traffic in the link adapters 202 of the receiving part of the switch. The main queuing points are located in the adapters 203 of the transmit part of the switching node, where the packets/cells wait to be transmitted on the output links. As illustrated by the three queues located inside the output adapters 203 and shown in more details in FIG. 3, a queuing and scheduling per priority is shown, in order to minimize delays and jitters for high priority/real time applications.

The inventors have shown, using modeling and simulations, that the probability distribution of the queuing time in this type of nodes can be approximated by an exponential law (the logarithm of the repartition function of the delay probability distribution is linear). It is then reasonable to compute quantile queuing delays in the output queues using this assumption.

Figure 3:
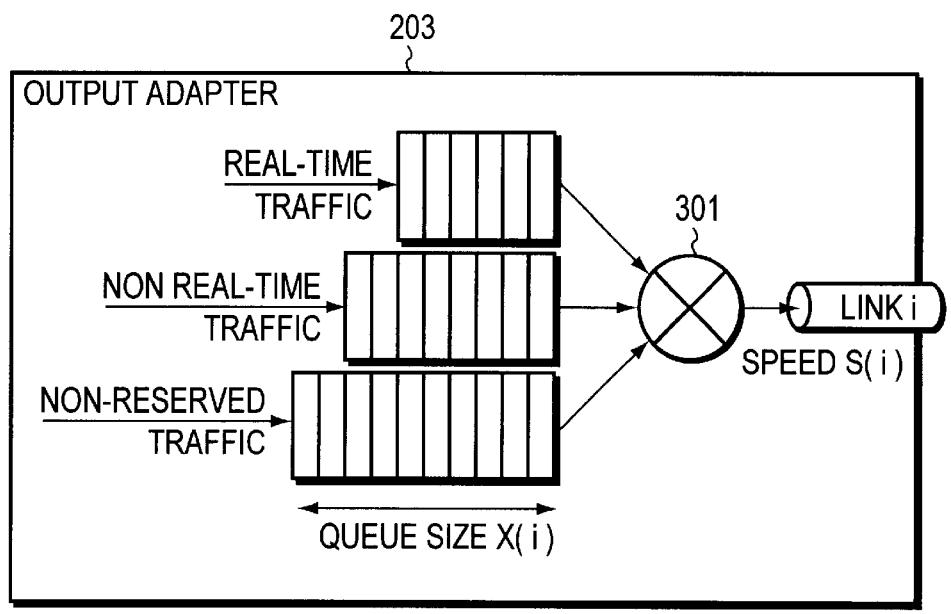
FIG. 3 shows a detailed view of the structure of one output queue of a switching node according to FIG. 2.

FIG. 3 shows a detailed view of the queues within an output adapter 203. A scheduler 301 ensures the jitters/delays minimization for high priority traffic through the use of queues of different size. For example, a top-priority queue for traffic with a guaranteed, very short end-to-end delay (real-time traffic). Assuming that a given queue i has a size of $X(i)$ (in bits), the maximum delay that a bit can wait inside this queue is $Qmax(i)=X(i)/S(i)$, where $S(i)$ is the speed of the link attached to this adapter. With the assumption that the queue is infinite, the probability to observe a delay that is higher than Qmax is the loss probability $\epsilon$ engineered for the considered link.

Let us consider a path of N consecutive nodes i (i=1 to N). For each node i the path selection process provides a set of values $(X(i), S(i))$ from the topology database. As mentionned above, it has been experimentally observed that one can approximate the repartition function of the delay probability distribution at node i by an exponential law, as expressed in the following formula:

$$F(T(i), t) = Prob(delay < t) = 1 - \exp\left(\frac{-t}{T(i)}\right) \quad (4)$$

and the corresponding probability density function is as follows:

$$f(T(i), t) = Prob(t < delay < t + dt) = \frac{1}{T(i)} \exp\left(\frac{-t}{T(i)}\right) \quad (5)$$

where T(i) is the mean delay associated with node i. Given that $F(T(i), Qmax) = 1 - \epsilon$, T(i) is evaluated from the maximum queuing time $Qmax(i) = X(i)/S(i)$ and the loss probability $\epsilon$ according to the following formula:

$$T(i) = -\frac{Qmax(i)}{\ln(\epsilon)} = \frac{-X(i)}{S(i) \cdot \ln(\epsilon)} \quad (6)$$

Delay Quantile

Now, one can define the delay quantile at p (p probability) at node i, Tqp(i), as the delay value for which the probability to observe in node i, a delay greater than this delay value is equal to p. This definition can be expressed by the following formula:

$$F(T(i), Tqp(i)) = Prob[delay < Tqp(i)] = 1 - \exp\left(\frac{-Tqp(i)}{T(i)}\right) = 1 - p \quad (7)$$

thus, using formula (6) above, one can deduce from (7):

$$Tqp(i) = Qmax(i) \cdot \frac{\ln(p)}{\ln(\epsilon)} = \frac{X(i)}{S(i)} \cdot \frac{\ln(p)}{\ln(\epsilon)} = -T(i) \cdot \ln(p) \quad (8)$$

In the preferred embodiment a 1% ($10^{-2}$) quantile is chosen for NRT (non real time) traffic for which the delay constraint is low, while more stringent quantile (e.g. $10^{-5}$) can be used for RT (real time) bursty traffic.

Convolution

Considering the entire path of N nodes, calculating a global delay quantile applying to the whole path would imply the calculation of convolution products of elementary repartition functions associated with each node along the path considered. As probability convolution functions are generally heavy to compute, implementing their computation would alter the performance (speed) of the call setup process. The inventors have found a method to approximate the convolution which is based on simulation results: the computation of an estimate Tconv of the total quantile delay at p of the path considered comprising N nodes relies on the following formula:

$$Tconv = (Tmean + \alpha \cdot Tvar) \cdot TAB(N) + \sum_{i=1}^{N} P(i) \quad (9)$$

Tmean and Tvar are computed as follows:

$$Tmean = \frac{1}{N} \cdot \sum_{i=1}^{N} T(i) \quad (10)$$

$$Tvar = \sqrt{\frac{1}{N} \sum_{i=1}^{N} (T(i) - Tmean)^2} \quad (11)$$

P(i) is the propagation time of the link that connects node i to node i+1.

TAB(N) is a tabulated value of a delay quantile at p for a cascade of N nodes with unit mean delay. TAB(N) has been determined empirically from simulations results. For $p = 10^{-2}$, TAB(N) (expressed in milliseconds) can be extracted from the following table:

| N  | TAB(N) |
|----|--------|
| 1  | 5      |
| 2  | 7      |
| 3  | 8.8    |
| 4  | 10.4   |
| 5  | 12     |
| 6  | 13.4   |
| 7  | 14.8   |
| 8  | 16.2   |
| 9  | 17.8   |
| 10 | 19     |
| 11 | 20.4   |
| 12 | 21.8   |
| 13 | 23.2   |
| 14 | 24.4   |
| 15 | 25.8   |
| 16 | 27     |
| 17 | 28.4   |
| 18 | 29.6   |
| 19 | 30.8   |
| 20 | 32.2   |

$\alpha$ is a coefficient which is determined empirically from simulation results and which depends on the quantile probability p that is considered (e.g. $p = 10^{-2}$ for NRT). $\alpha$ can be expressed as follows:

$$\alpha = k(p) \frac{Tvar}{Tmean} \quad (12)$$

with $k(10^{-2}) = 0.3$

Figure 4:
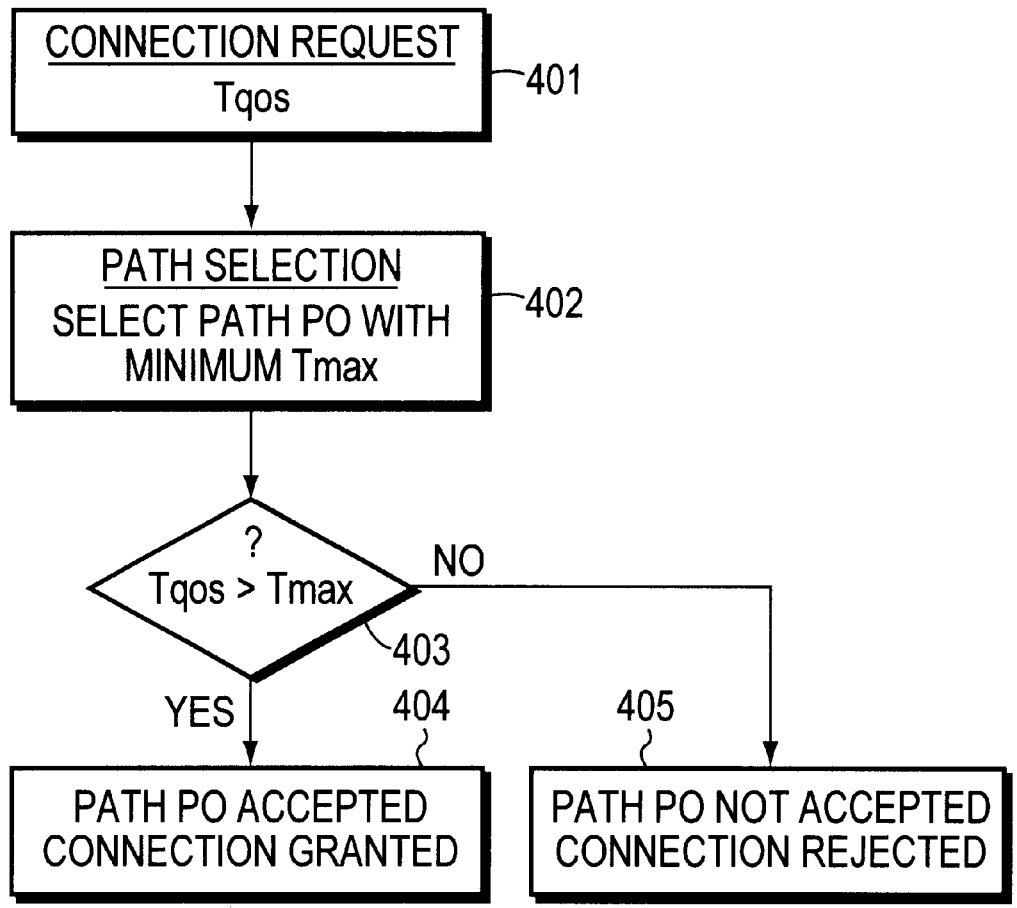
FIG. 4 describes a typical call setup process, based on a common path selection process.

Referring to FIG. 4 it is presented a call setup process based on a common path selection process. In step 401, there is a connection request associated with QoS requirements that include an end-to-end delay Tqos requirement. In step 402 the path selection process computes for each available path, the maximum delay Tmax according to formula (2). Then the path (P0) with the smallest Tmax is kept. In step 403 Tmax is compared to Tqos, if Tqos is greater than Tmax then the selected path is accepted (step 404) and the connection granted, otherwise the connection is rejected (step 405).

Figure 5:
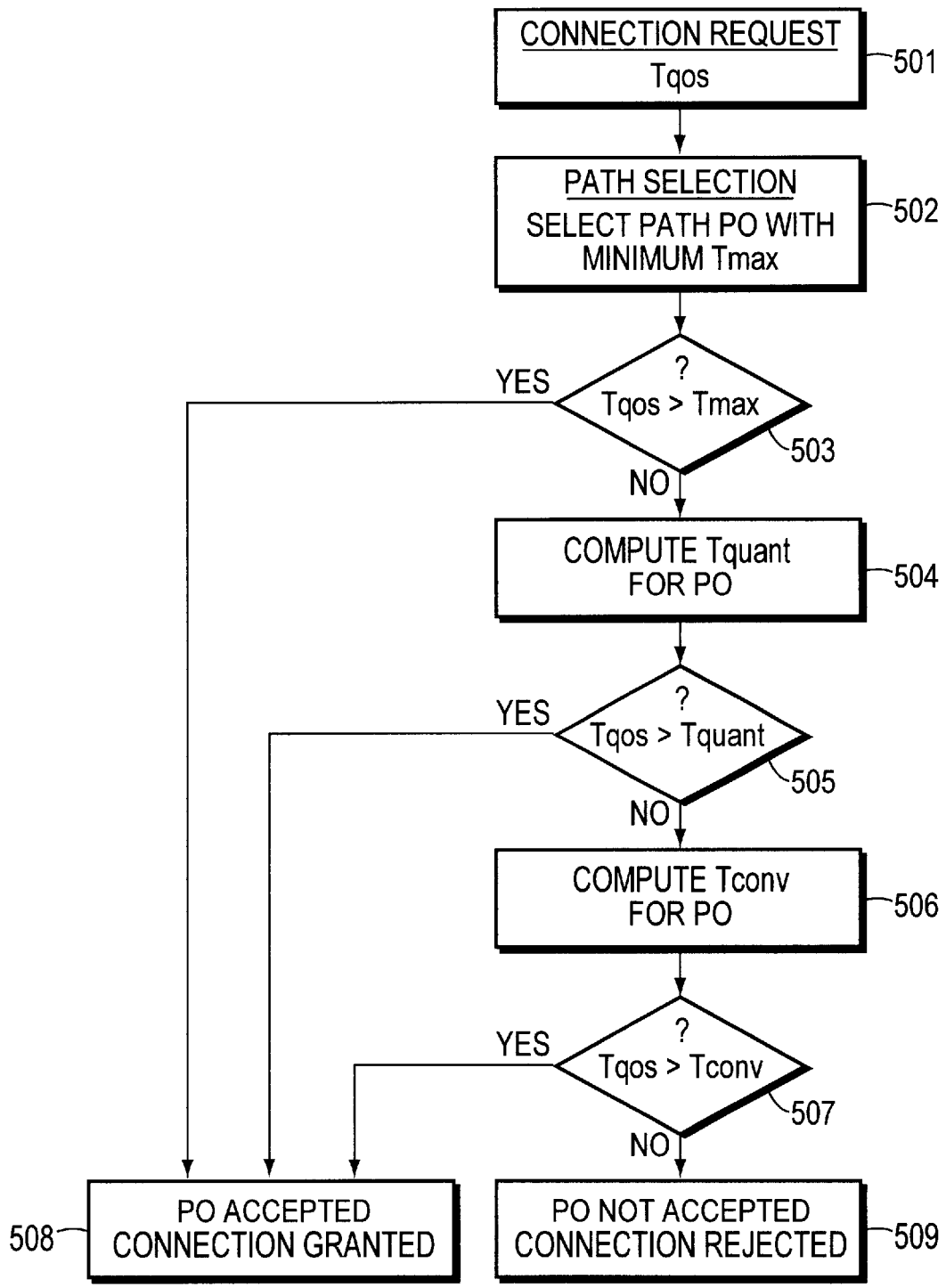
FIG. 5 shows a flow chart of a call setup process implementing the end-to-end delay estimation method.

Referring now to FIG. 5 a call process according to the present invention includes in the step 501, a connection request associated with a EED Tqos requirement. In step 502 there is a search of the path (P0) with minimal accumulated maximum delay Tmax as in FIG. 4, since that path should also correspond to the path with minimum quantile delay. In step 503, Tmax is compared to Tqos, if Tqos is greater than Tmax then the selected path is accepted and the connection granted, otherwise the connection is rejected. In step 504, the quantile delays Tqp(i) per node along the path selected are computed (according to formula (8)) in order to make an approximation Tquant of the total quantile delay Tconv through the following formula:

$$Tquant = \sum_{i=1}^{N} (Tqp(i) + P(i)) \quad (13)$$

where P(i) is the propagation time of the link that connects node i to node i+1.

It is noted that the quantile delays Tqp(i) are easily derivable from the T(i) values (see formula (8)) which are stored in the topology database, and that Tquant overestimates Tconv.

In step 505 the QoS delay Tqos is compared to Tquant: if Tqos is greater than Tquant then the selected path is accepted and the connection granted, otherwise as shown in step 506, Tconv is computed according to formula (9). In step 507 Tqos is compared to Tconv: if Tqos is greater than Tconv then the selected path (P0) is accepted, as shown in step 508, and the connection granted, otherwise the connection is rejected, as shown in step 509.

Experimental results

In the following tables, simulation results are reported that illustrate the different approaches for estimating the transit delay per node and the end-to-end delay of a path.

Table 1, hereunder, reports for three standardized types of link (T1, T3, OC3), the delays obtained using:

1) the max delay approach (Qmax(i), formula (3));
2) the mean delay approach (T(i), formula (6));
3) the 1% quantile delay approach, (Tqp(i) with $p=10^{-2}$, formula (8)). The delay values are expressed in milliseconds.

TABLE 1

| Link type i | Max delay Qmax(i) (ms) | Mean delay T(i) (ms) | 1% quantile Tqp(i) (ms) |
|---|---|---|---|
| T1 (1/5 Mbps) | 1358 | 80 | 372 |
| T3 (45 Mbps) | 46 | 3 | 12 |
| OC3 (155 Mbps) | 13 | 1 | 4 |

The delay values of table 1 have been used to estimate the end-to-end delay on various paths with four different methods:

a) Sum of max delay per node (Tmax, formula (2) with propagation delay P(i) set to zero);
b) Sum of 1% quantile delay per node (Tquant, formula (13) with propagation delay P(i) set to zero);
c) Convolution approximation (Tconv, formula (9) with propagation delay P(i) set to zero);
d) Exact convolution computation.

The results, expressed in milliseconds, are shown in following table 2:

TABLE 2

| PATH | Tmax (ms) | Tquant (ms) | Tconv (ms) | Exact Convol. |
|---|---|---|---|---|
| 2 T1 | 2716 | 744 | 565 | 560 |
| 3 T1 | 4074 | 1116 | 710 | 680 |
| 4 T1 | 5432 | 1488 | 840 | 820 |

TABLE 2-continued

| PATH | Tmax (ms) | Tquant (ms) | Tconv (ms) | Exact Convol. |
|---|---|---|---|---|
| 5 T1 | 6790 | 1860 | 969 | 920 |
| 6 T1 | 8148 | 2232 | 1082 | 1040 |
| 7 T1 | 9506 | 2604 | 1196 | 1140 |
| 8 T1 | 10864 | 2976 | 1309 | 1260 |
| 2 T3 | 92 | 25 | 19 | 19 |
| 3 T3 | 138 | 38 | 24 | 24 |
| 4 T3 | 184 | 50 | 28 | 28 |
| 5 T3 | 230 | 63 | 32 | 31 |
| 1T1 1T3 | 1404 | 384 | 368 | 390 |
| 1T1 2T3 | 1450 | 397 | 377 | 390 |
| 1T1 3T3 | 1496 | 410 | 391 | 390 |
| 1T1 4T3 | 1542 | 422 | 411 | 390 |
| 2T1 1T3 | 2762 | 756 | 547 | 550 |
| 2T1 2T3 | 2808 | 769 | 548 | 550 |
| 2T1 3T3 | 2854 | 781 | 562 | 550 |
| 2T1 4T3 | 2900 | 794 | 574 | 550 |
| 3T1 1T3 | 4120 | 1129 | 694 | 680 |
| 3T1 2T3 | 4166 | 1141 | 700 | 680 |
| 3T1 3T3 | 4212 | 1154 | 706 | 690 |
| 3T1 6T3 | 4350 | 1192 | 763 | 690 |
| 2T3 1OC3 | 105 | 29 | 19 | 20 |
| 2T3 2OC3 | 118 | 32 | 20 | 20 |
| 2T3 3OC3 | 131 | 35 | 21 | 21 |
| 3T3 2OC3 | 164 | 45 | 25 | 24 |
| 3T3 3OC3 | 177 | 48 | 26 | 25 |
| 1T1 3T3 1OC3 | 1509 | 413 | 413 | 390 |
| 1T1 3T3 3OC3 | 1535 | 420 | 453 | 390 |

From table 2 one can see that the common "sum of max delay per node", Tmax approach provides very high end-to-end delay values which are unrealistic in terms of probability. The second method of "sum of 1% quantile delay per node", Tquant provides delay values which are closer to the reference values provided from the "exact convolution" calculation, while the values provided by the "convolution approximation" method Tconv closely match the values from the "exact convolution" calculation.

In brief the present invention provides a method to compute the end-to-end delay of a path which is much more accurate than the common approach of "sum of max delay per node", because it relies on a probabilistic approach i.e. delay quantile approach. Furthermore this method allows a computation of the EED which is adaptive to the class of service requested e.g. real-time, non real-time, by selecting accordingly a probability value (p) which drives the delay quantile calculation.

We claim:

1. A network arrangement in a communication network for packet switched communication for estimating an end to end delay of a path comprising N nodes from an origin node to a destination node, the communication network node having at least one input and at least one output with a queuing delay associated with passage of a packet from one input to one output, the network arrangement comprising:

(a) means for computing for each node (i) of N nodes along said path an estimated queuing delay Tqp(i) where Tqp(i) is a delay value for which a probability distribution to observe in node(i), a delay greater than said delay value is equal to probability P (b) means for combining for each node (i) of the path said estimated queuing delay Tqp(i) with the propagation time (P(i)) of the link that connects said each node (i) to the next node (i+1) of said path to provide a second delay value associated with said each node (i);

(c) means for combining all said second delay values to provide an estimation of the end-to-end delay (Tquant) of said path.

2. A network node according to claim 1 wherein said probability distribution for packet transmission times through the node is approximated by an exponential law.

3. A network node according to claim 2 wherein said estimated queuing delay is proportional to the ratio of the length (X(i)) of the queue of said node and a speed (S(i)) of a link that is connected to said queue.

4. A network node according to claim 3 wherein said estimated queuing delay (Tqp(i)) is computed according to the following formula:

$$Tqp(i) = \frac{X(i)}{S(i)} \cdot \frac{\ln(p)}{\ln(\epsilon)}$$

where:
X(i) is the length of the queue at said node;
S(i) is speed of the link that is connected to the queue;
p is the selected probability;
$\epsilon$ is the engineered loss probability of the link connected to the queue.

5. A method for estimating the end-to-end delay of a path comprising N nodes from an origin to a destination node in a communications network, said method, including the stpes of:
   (a) computing for each node (i) along said path an estimated queuing delay (Tqp) (i) where Tqp(i) is a delay value for which a probability distribution to observe in node (i), a delay greater than said delay value is equal to P, P being the probability;
   (b) combining for each node (i) of the path said estimated queuing delay (Tqp)(i) with the propagation time (P(i)) of the link that connects said each node (i) to the next node (i+1) of said path to provide a second delay value associated with said each node (i); and
   (c) combining all said second delay values to provide an estimation of the end-to-end delay (Tquant) of said path.

6. A method according to claim 5 wherein the combination of step b) is an addition.

7. A method according to claim 5 wherein the combination of step c) is an addition.

8. A method for estimating the end-to-end delay of a path comprising N nodes from an origin node to a desination node in a communication network, said method including:
   (a) computing for each node (i) along said path an estimated queuing delay (Tqp(i), where Tqp(i) is a delay value for which a probability distribution to observe in node (i), a delay greater than said delay value is equal to P, P being the probability;
   (b) accumulating said estimated queuing delays and storing the result in a table to provide a tabulated queuing delay (TAB(N));
   (c) computing an end-to-end delay estimation (Tconv) which comprises an approximation of the convolution function of said queuing delays (Tqp(i)) extracted from said table (TAB(N)).

9. A method according to claim 8 wherein the step (c) is achieved by using the following formulae:

$$Tconv = (Tmean + \alpha \cdot Tvar) \cdot TAB(N) + \sum_{i=1}^{N} P(i)$$

$$Tmean = \frac{1}{N} \sum_{i=1}^{N} T(i)$$

$$Tvar = \sqrt{\frac{1}{N} \sum_{i=1}^{N} (T(i) - Tmean)^2}$$

where P(i) is the propagation time of the link that connects said each node (i) to the next node (i+1);
T(i) is the mean delay associated with node i;
TAB(N) is a tabulated queuing delay for a cascade of N nodes with unit mean delay;
$\alpha$ is a coefficient which is determined empirically.

10. A method for estimating the delay for node in a path of N nodes of a packet switched communication network, said method including the steps of;
   (a) computing an estimated queuing delay Tqp(i) for the node where Tqp(i) is a delay value for which a probability distribution to observe in node (i) a delay greater than said delay value is equal to P, P being the probability;
   (b) determining the propagation (P(i)) of a link that connects said node to the next node; and
   (c) combining said estimated queuing delay (Tqp)(i) and the propagation time (P(i)) of the link to provide the delay value for said node.

11. The method of claim 10 further including the steps of summing the delay value for each node in the path of N nodes to generate a value for the path delay.

* * * * *